US006977828B2

(12) United States Patent
Wada

(10) Patent No.: US 6,977,828 B2
(45) Date of Patent: Dec. 20, 2005

(54) DC-DC CONVERTER APPLIED TO SEMICONDUCTOR DEVICE

(75) Inventor: Masaharu Wada, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 119 days.

(21) Appl. No.: 10/601,538

(22) Filed: Jun. 24, 2003

(65) Prior Publication Data

US 2004/0213024 A1 Oct. 28, 2004

(30) Foreign Application Priority Data

Apr. 22, 2003 (JP) .................................... 2003-117289

(51) Int. Cl.[7] ............................................ H02M 3/07

(52) U.S. Cl. ...................................... 363/60; 323/282

(58) Field of Search ......................... 323/282; 363/59, 363/60

(56) References Cited

U.S. PATENT DOCUMENTS 5,757,173 A * 5/1998 Agiman ..................... 323/282
6,107,862 A * 8/2000 Mukainakano et al. ..... 327/536
6,356,062 B1 * 3/2002 Elmhurst et al. ........... 323/282
6,411,531 B1 * 6/2002 Nork et al. .................. 363/60
6,570,368 B2 * 5/2003 Demizu ...................... 323/282

FOREIGN PATENT DOCUMENTS

| | | |
|---|---|---|
| JP | 10-302492 | 11/1998 |
| JP | 2001-78437 | 3/2001 |
| JP | 2001-309643 | 11/2001 |
| JP | 2002-204567 | 7/2002 |
| JP | 2002-237192 | 8/2002 |

* cited by examiner

*Primary Examiner*—Jeffrey Sterrett
(74) *Attorney, Agent, or Firm*—Oblon, Spivak, McClelland, Maier & Neustadt, P.C.

(57) ABSTRACT

An oscillator produces a signal. A voltage generating circuit is responsive to the output signal of the oscillator to generate a second voltage different from a first voltage. A voltage detecting circuit detects the output voltage of the voltage generating circuit and outputs an output voltage corresponding to the second voltage. A comparator makes a comparison between the output voltage of the voltage detecting circuit and a reference voltage with each cycle of the output signal of the oscillator and controls the operation of the voltage generating circuit.

21 Claims, 11 Drawing Sheets

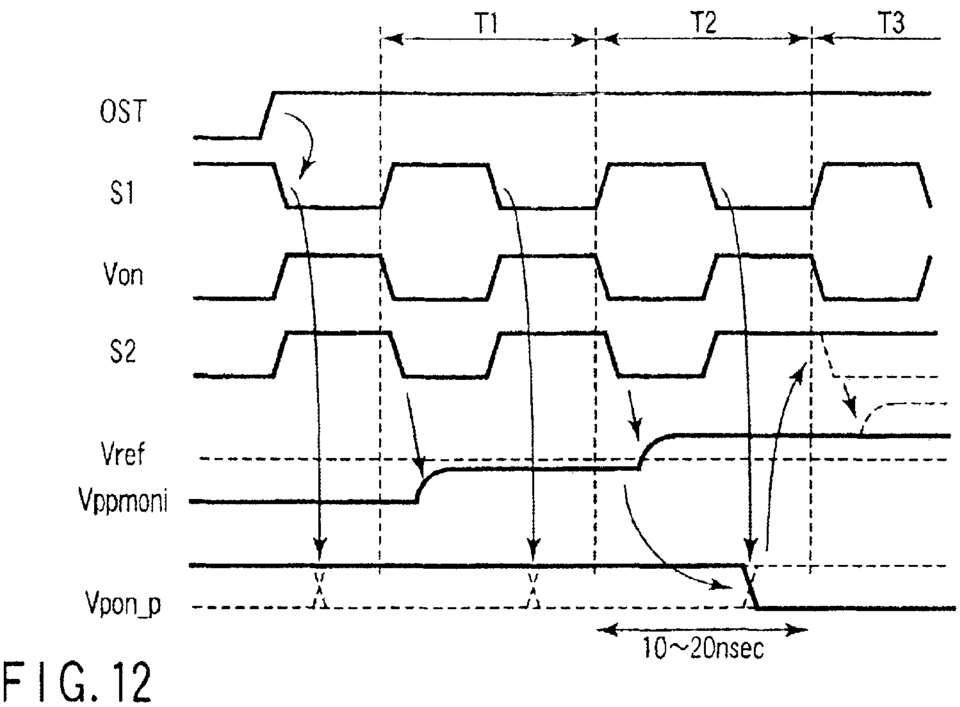
F I G. 12
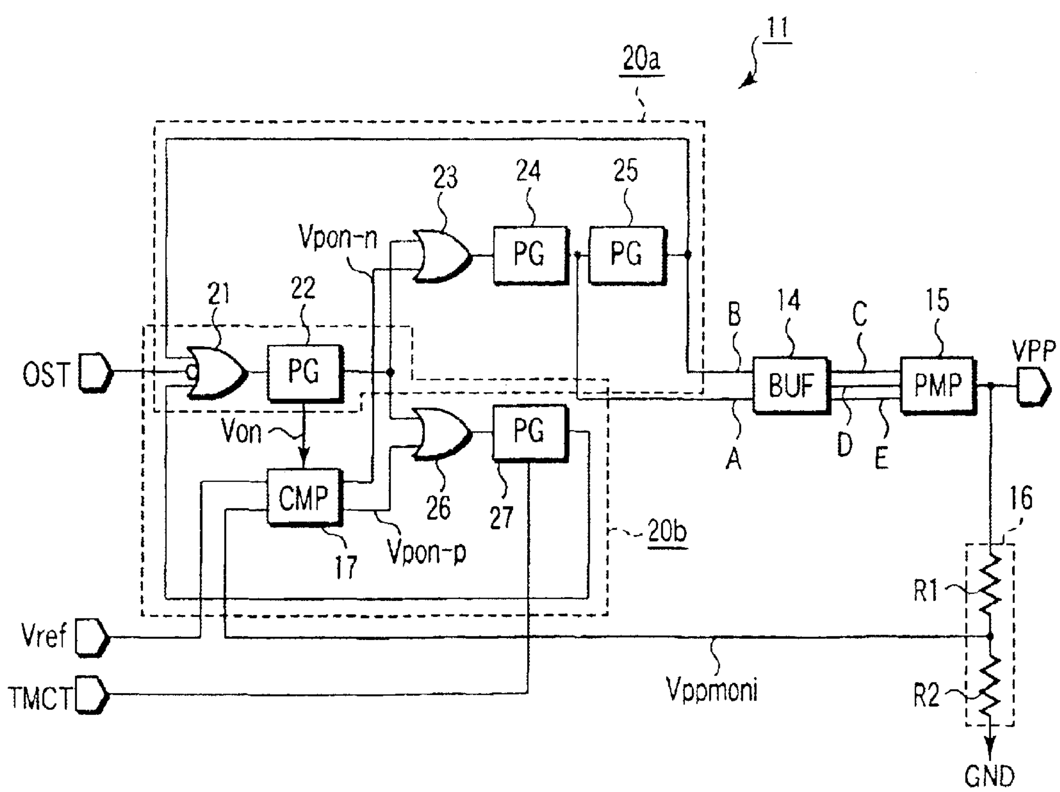
F I G. 13

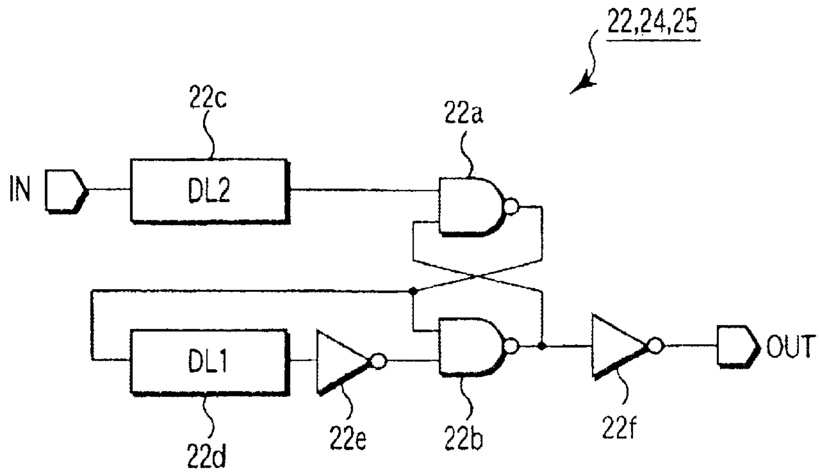
F I G. 14
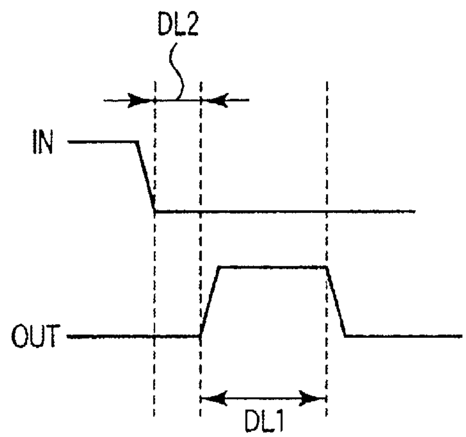
F I G. 15
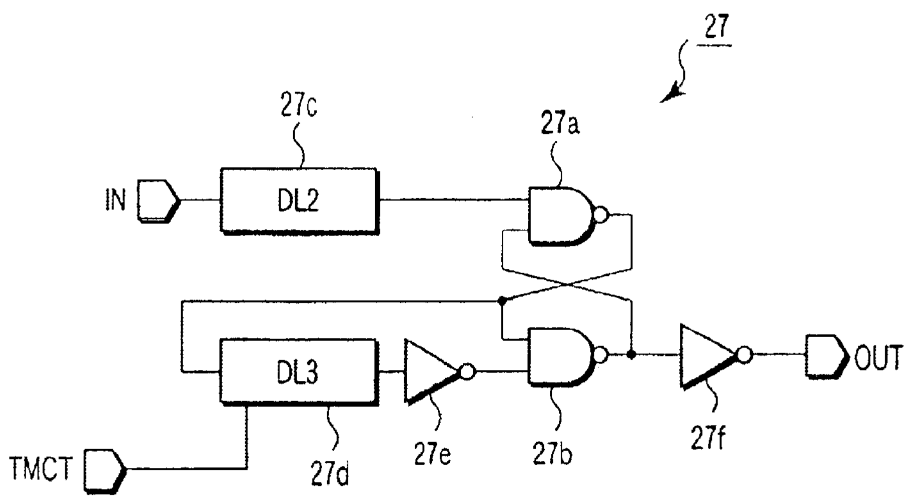
F I G. 16

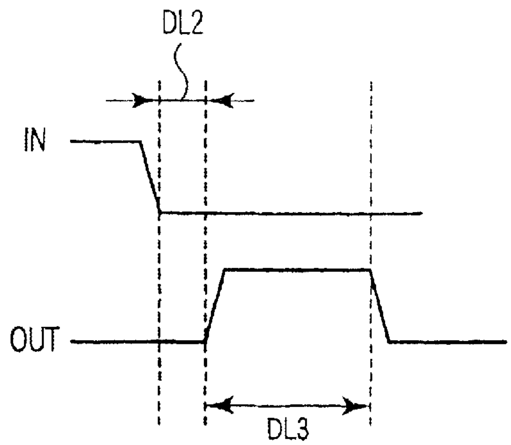
F I G. 17
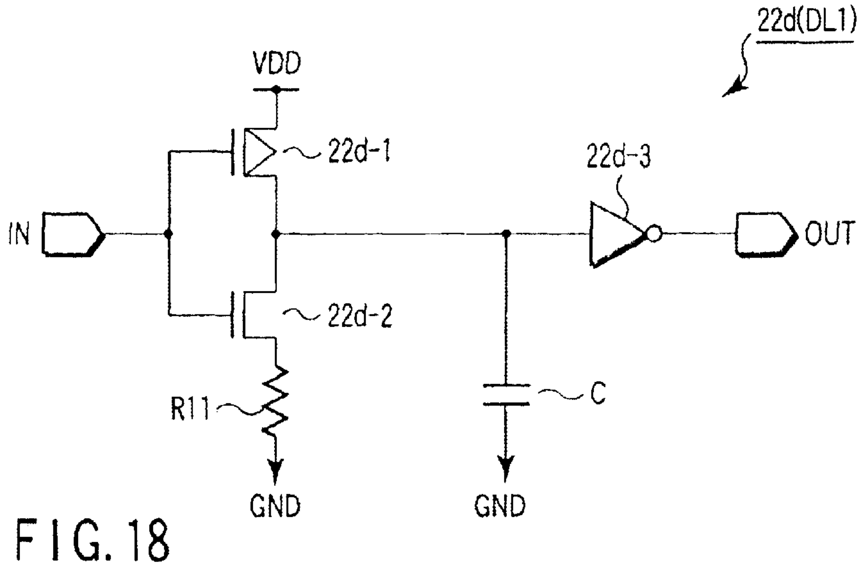
F I G. 18
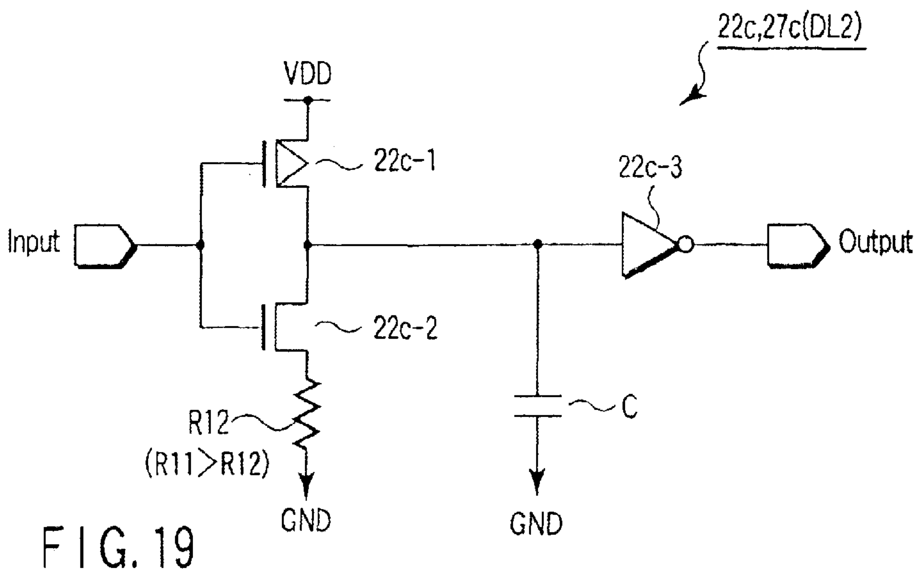
F I G. 19

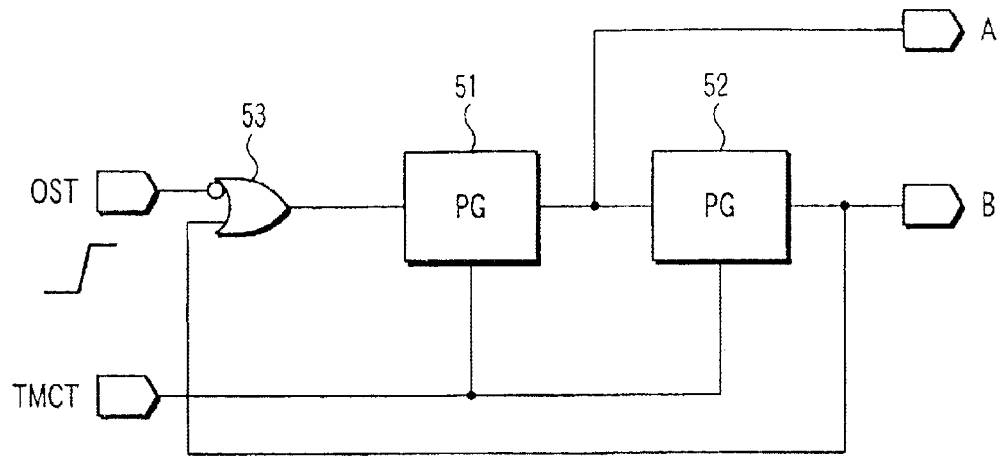
F I G. 24
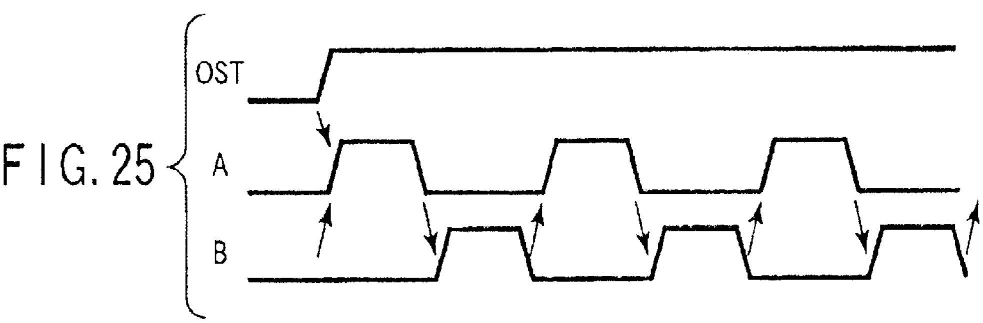
F I G. 25
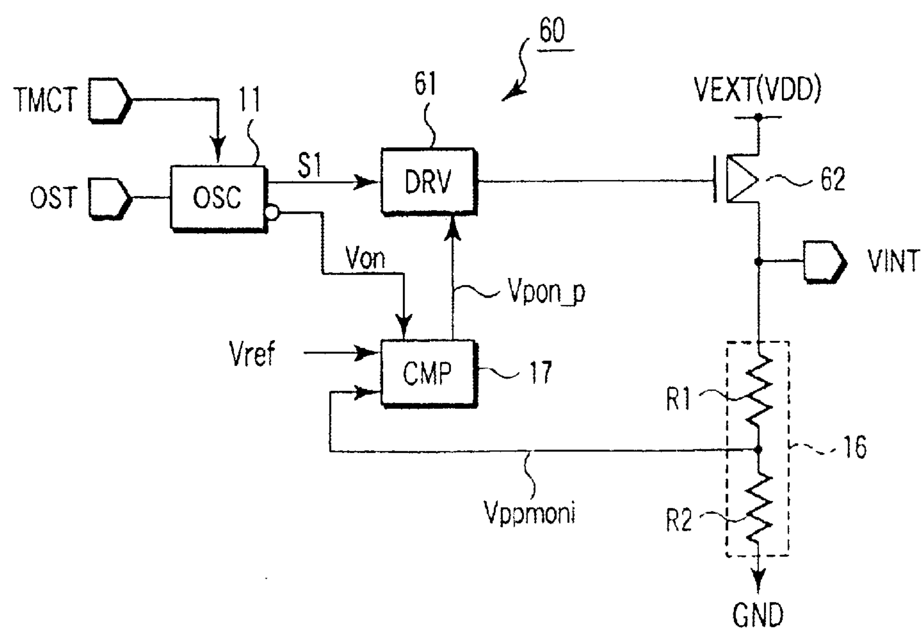
F I G. 26

DC-DC CONVERTER APPLIED TO SEMICONDUCTOR DEVICE

CROSS-REFERENCE TO THE RELATED APPLICATIONS

This application is based upon and claims the benefit of priority from the prior Japanese Patent Application No. 2003-117289, filed Apr. 22, 2003, the entire contents of which are incorporated herein by reference.

BACKGROUND OF THE INVENTION

1. Field of the Invention

The present invention relates to a DC—DC converter which forms, for example, a boosting (stepup) or bucking (stepdown) circuit that increases or decreases a direct-current voltage.

2. Description of the Related Art

FIG. 28 shows an example of a conventional boosting circuit, which is composed of an oscillator (OSC) 1, a pump circuit (PMP) 2, a voltage detecting circuit 3 consisting of resistors R1 and R2, and a comparator (CMP) 4. The oscillator 1 produces a pulse signal. The pump circuit 2, which is formed of a capacitor and a charge-transfer diode or a capacitor and a charge-transfer transistor, produces a boosted voltage in response to the output signal of the oscillator 1. The voltage detecting circuit 3 detects the output voltage of the pump circuit 2. The comparator 4, which is comprised of a differential amplifier by way of example, makes a comparison between the output voltage of the voltage detecting circuit 3 and a reference voltage Vref and then outputs a signal corresponding to the difference therebetween. When the output voltage of the voltage detecting circuit 3 is lower than the reference voltage Vref, the comparator 4 enables the oscillator 1. When the output voltage of the voltage detector 3 is higher than the reference voltage Vref, that is, when the boosted voltage has reached the target voltage, the comparator 4 disables the oscillator 1.

As an invention relating to this type of boosting circuit, a circuit is known which is capable of producing a high voltage with low power dissipation (see, for example, Unexamined Japanese Patent Publication No. 10-302492).

With the comparator comprised of a differential amplifier, its output response is slow when the bias current is low. Increasing the bias current in order to make the response faster results in increased current dissipation. For this reason, it is not desirable to supply too high a bias current. Consequently, the conventional comparator is used in a state where its output response is slow. Thus, it is impossible for the comparator which is slow in response to stop the operation of the boosting circuit as soon as its output voltage has reached the target voltage. The pump circuit 2 would therefore be shut down after several pumping operations. For this reason, the boosted voltage would increase above the target voltage, causing a ripple. In general, a decoupling capacitor is connected between the output of the pump circuit 2 and ground potential in order to reduce the ripple. To reduce the ripple, however, a capacitor of large capacitance would be needed. Thus, the method for reducing the ripple using a capacitor involves a problem that the chip size increases.

If the pump circuit 2 should be disabled in the middle of an operation, charges may remain on the capacitor that forms the pump circuit or they may flow backward. These charges may cause noise. It is therefore required to disable the pump circuit precisely. The above problems were described in terms of a boosting circuit; however, the same applies to a bucking circuit.

Accordingly, there is a demand for a DC—DC converter that is capable of reducing the ripple in the output voltage and preventing the generation of noise.

BRIEF SUMMARY OF THE INVENTION

According to an aspect of the present invention, there is provided a DC—DC converter circuit comprising: an oscillator which produces a signal; a voltage generating circuit which is supplied with a first voltage and responsive to the output signal of the oscillator to generate a second voltage different from the first voltage; a voltage detecting circuit which is connected to the output of the voltage generating circuit to detect the second voltage output from the voltage generating circuit and output an output voltage corresponding to the second voltage; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the voltage generating circuit in accordance with the result of the comparison.

According to another aspect of the present invention, there is provided a DC—DC converter circuit comprising: an oscillator which produces a signal; a timing generator which is supplied with the output signal of the oscillator to generate a plurality of timing signals; a pump circuit which is supplied with the timing signals from the timing generator and a first voltage to generate a second voltage higher than the first voltage in response to the timing signals; a voltage detecting circuit which is connected to the output of the pump circuit to detect the second voltage output from the pump circuit and output an output voltage corresponding to the second voltage; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the timing generator.

According to still another aspect of the present invention, there is provided a DC—DC converter circuit comprising: a first pulse generator responsive to an input signal to output a first pulse signal; first and second switch circuits which are supplied with the first pulse signal output from the first pulse generator; a second pulse generator which is connected to the output of the first switch circuit to output a plurality of second pulse signals in response to the output signal of the first pulse generator supplied from the first switch circuit; a pump circuit which is supplied with the plurality of second pulse signals output from the second pulse generator and a first voltage and boosts the first voltage to a second voltage in response to the plurality of second pulse signals; a voltage detecting circuit which is connected to the output of the pump circuit to detect the second voltage output from the pump circuit and output an output voltage corresponding to the second voltage; a comparator which is supplied with the first pulse signal output from the first pulse generator, the output voltage of the voltage detecting circuit, and a reference voltage, the comparator making a comparison between the output voltage of the voltage detecting circuit and the reference voltage with each cycle of the first pulse signal and turning the first switch circuit off and the second switch circuit on when the output voltage of the voltage detecting circuit is higher than the reference voltage; and a third pulse generator which is connected to the output of the second switch circuit to generate a third pulse signal and apply it to the first pulse generator in response to the output signal of the first pulse generator supplied via the second switch circuit.

According to a further aspect of the present invention, there is provided a DC—DC converter circuit comprising: a first oscillator which output a first pulse signal; a second oscillator which output a second pulse signal; a timing generator which is supplied with the first pulse signal output from the first oscillator to generate a plurality of timing signals; a pump circuit which is supplied with the timing signals from the timing generator and a first voltage to boost the first voltage to a second voltage in response to the timing signals; a voltage detecting circuit which is connected to the output of the pump circuit to detect the second voltage output from the pump circuit and output an output voltage corresponding to the second voltage; and a comparator which is supplied with the first and second pulse signals output from the first and second oscillators, the output voltage of the voltage detecting circuit, and a reference voltage, the comparator making a comparison between the output voltage of the voltage detecting circuit and the reference voltage with each cycle of one of the first and second pulse signals and turning the first oscillator off and the second oscillator on when the output voltage of the voltage detecting circuit is higher than the reference voltage.

According to a still further aspect of the present invention, there is provided a DC—DC converter circuit comprising: a first pulse generator which generates a first pulse signal; a second pulse generator which is connected to the first pulse generator to generate a second pulse signal in response to the first pulse signal; a third pulse generator which generates a third pulse signal; a pump circuit which is supplied with the second pulse signal output from the second pulse generator and a first voltage and boosts the first voltage to a second voltage in response to the second pulse signal; a voltage detecting circuit which is connected to the output of the pump circuit to detect the second voltage output from the pump circuit and output an output voltage corresponding to the second voltage; and a comparator which is supplied with the first and third pulse signals output from the first and third pulse generators, the output voltage of the voltage detecting circuit, and a reference voltage, the comparator making a comparison between the output voltage of the voltage detecting circuit and the reference voltage with each cycle of one of the first and third pulse signals and turning the first pulse generator off and the second pulse generator on when the output voltage of the voltage detecting circuit is higher than the reference voltage.

According to yet another aspect of the present invention, there is provided a DC—DC converter circuit comprising: an oscillator which produces a signal; a transistor connected between a first power supply and an output terminal; a drive circuit which is responsive to the output signal of the oscillator to drive the transistor; a voltage detecting circuit which is connected to the output terminal to detect the voltage output from the output terminal and output an output voltage corresponding to the voltage at the output terminal; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the drive circuit.

BRIEF DESCRIPTION OF THE SEVERAL VIEWS OF THE DRAWING

FIG. 12 is a waveform diagram illustrating the operation of the DC—DC converter in FIG. 1;

FIG. 13 is a schematic and block diagram representation of a DC—DC converter according to a second embodiment of the present invention which is used as a boosting circuit;

FIG. 14 shows an exemplary arrangement of the pulse generators 22, 24 and 25 in FIG. 13;

FIG. 15 is a waveform diagram illustrating the operation of the pulse generators in FIG. 14;

FIG. 16 shows an exemplary arrangement of the pulse generator 27 in FIG. 13;

FIG. 17 is a waveform diagram illustrating the operation of the pulse generator in FIG. 16;

FIG. 18 shows an exemplary arrangement of the delay circuit **22*d* in FIG. 14**;

FIG. 19 shows an exemplary arrangement of the delay circuits **22*c* and 27*c* in FIGS. 14 and 16**;

FIG. 24 shows a modification of the pulse generators in FIG. 22;

FIG. 25 is a waveform diagram illustrating the operation of the pulse generator in FIG. 24;

FIG. 26 is a schematic and block diagram representation of a DC—DC converter according to a fifth embodiment of the present invention which is used as a bucking circuit;

DETAILED DESCRIPTION OF THE INVENTION

Hereinafter, the preferred embodiments of the present invention will be described with reference to the accompanying drawings.

[First Embodiment]

Figure 1:
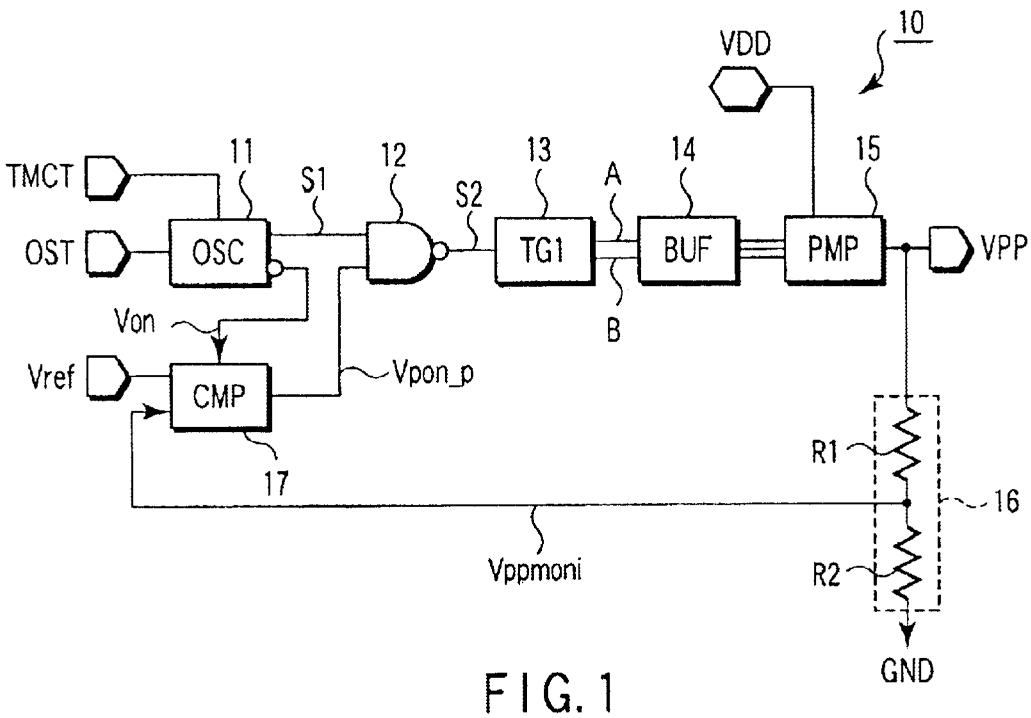
FIG. 1 is a schematic and block diagram representation of a DC—DC converter according to a first embodiment of the present invention which is used as a boosting circuit.

FIG. 1 shows a DC—DC converter according to a first embodiment which is used as a boosting circuit.

This boosting circuit, indicated at 10, comprises an oscillator (QSC) 11, a NAND gate 12, a timing generator (TG1) 13, a buffer circuit (BUF) 14, a pump circuit (PMP) 15, a voltage detecting circuit 16 consisting of resistors R1 and R2, and a synchronous comparator (CMP) 17.

The oscillator 11 is enabled by a signal OST. The oscillator 11 continues oscillation while the signal OST is at a high level. The period of a pulse signal output from the oscillator 11 is variably controlled based on the magnitude of a signal TMCT, which will be described later. The oscillator 11 outputs signals S1 and Von. The signal Von is applied to the comparator 17. The signal S1 is applied to the NAND gate 12 together with an output signal Vpon_p of the comparator 17. The NAND gate 12 is responsive to the signal Vpon_p to control whether to allow the output signal S1 of the oscillator 11 to pass through or not. An output signal S1 of the NAND gate 12 is applied through the timing generator (TG1) 13 and the buffer circuit (BUF) 14 to the pump circuit 15. An output voltage VPP of the pump circuit 15 is detected by the voltage detecting circuit 16 consisting of the resistors R1 and R2. An output voltage Vppmoni of the voltage detecting circuit 16 is applied to the comparator 17, which compares the input voltage with a reference voltage Vref to output the signal Vpon_p. The operation of the comparator 17 is synchronized with the signal Von. That is, the comparator 17 is responsive to the signal Von to perform a compare operation each time the pulse signal S1 is output from the oscillator 11.

Figure 2:
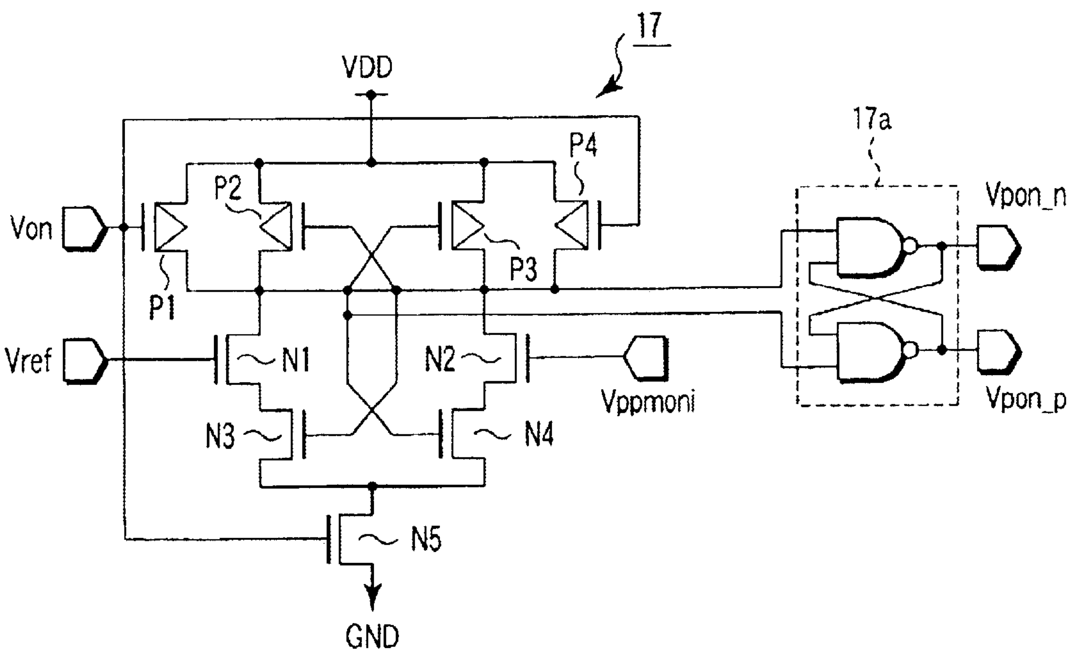
FIG. 2 shows an exemplary arrangement of the comparator in FIG. 1.

FIG. 2 shows an exemplary arrangement of the comparator 17, which is composed of P channel MOS transistors P1 through P4, N channel MOS transistors N1 through N5, and a flip-flop circuit 17*a*. The reference voltage Vref is applied to the gate of the transistor N1. The output voltage Vppmoni of the voltage detecting circuit 16 is applied to the gate of the transistor N2. The output signal Von of the oscillator 11 is applied to the gates of the transistors P1, P4 and N5. The node at which the transistors P3, P4 and N2 are connected is connected to the set input of the flip-flop circuit 17*a*. The node at which the transistors P1, P2 and N1 are connected is connected to the reset input of the flip-flop circuit 17*a*. The flip-flop circuit 17*a* outputs signals Vpon_p and Vpon_n. Of the output signals Vpon_p and Vpon_n of the flip-flop circuit 17*a*, the signal Vpon_p is applied to the NAND gate 12.

The comparator 17 thus arranged is activated to perform a compare operation when the signal Von goes high. When, at this point, the output voltage Vppmoni of the voltage detecting circuit 16 is lower than the reference voltage Vref, the transistors N1 and P3 are rendered conductive, causing the output signals Vpon_p and Vpon_n of the flip-flop circuit 17*a* to go high and low, respectively. On the other hand, when the output voltage Vppmoni of the voltage detecting circuit 16 is higher than the reference voltage Vref, the transistors N2 and P2 are rendered conductive, causing the output signals Vpon_p and Vpon_n of the flip-flop circuit 17*a* to go low and high, respectively. The comparator 17 is synchronized with the output signal Von of the comparator 17. For this reason, the output signals Vpon_p and Vpon_n of the comparator 17 can be established within one cycle of a pumping operation.

Figure 3:
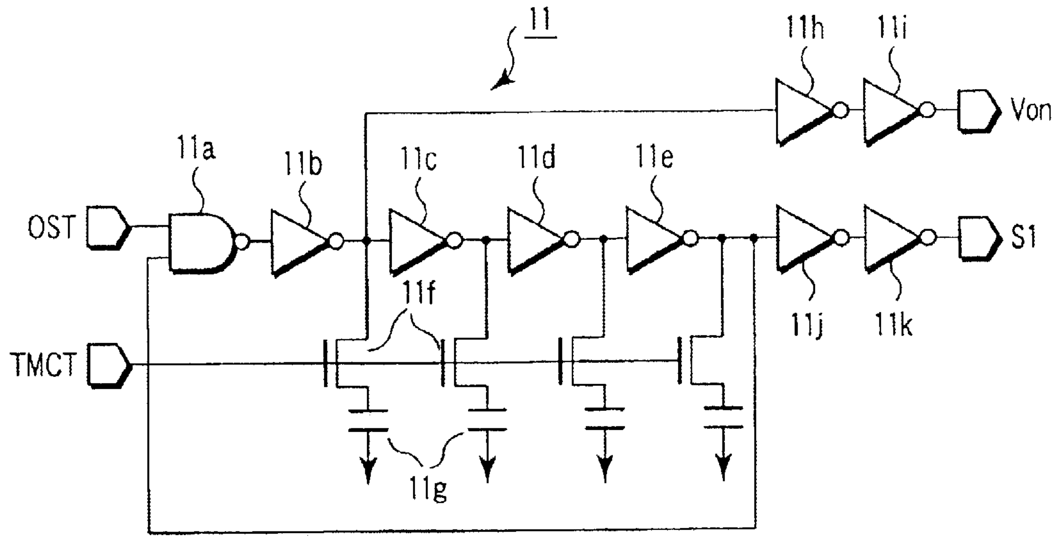
FIG. 3 shows an exemplary arrangement of the oscillator in FIG. 1.

FIG. 3 shows an exemplary arrangement of the oscillator 11. This oscillator, which is a so-called ring oscillator, comprises a NAND gate 11*a*, a plurality of series-connected inverters 11*b* through 11*e*, series combinations each of an N channel MOS transistor 11*f* and a capacitor 11*g* each of which is connected between the output of a respective one of the series-connected inverters and ground, a series combination of inverters 11*h* and 11*i* connected to the output of the inverter 11*b*, and a series combination of inverters 11*j* and 11*k* connected to the output of the inverter 11*e*.

The signal OST is applied to an input of the NAND gate 11*a*. The signal TMCT is applied to the gates of the transistors 11*f*. The period of the pulse signal output from the oscillator 11 is varied by controlling the resistance of each of the transistors 11*f* with the signal TMCT. For this reason, the current dissipation in the boosting circuit can be varied between the time when a circuit that is connected to the output of the pump circuit is activated and the time when it is deactivated. For example, when the chip is on standby, output charges of the pump circuit are not consumed. For this reason, the period of the pulse signal output from the oscillator 11 is made longer to reduce the current dissipation. Conversely, when the chip is in operation, the period of the pulse signal output from the oscillator 11 is made shorter, causing the pump circuit to operate faster and the output current to increase.

The oscillation period of the oscillator 11 can be changed not only by changing the resistance of each of the transistors 11*f* but also by changing the capacitance of each of the capacitors 11*g*.

Figure 4:
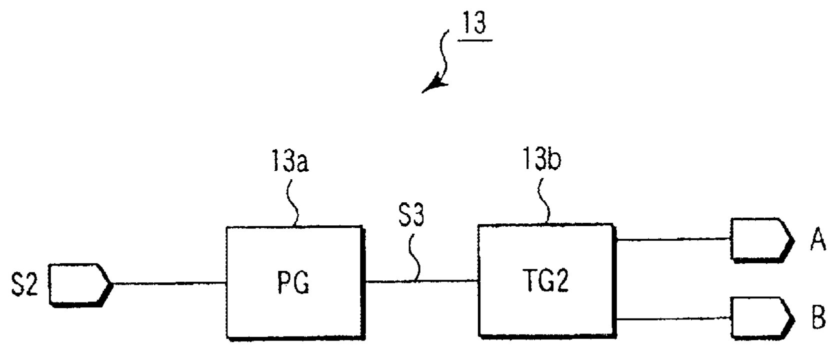
FIG. 4 is a block diagram of the timing generator in FIG. 1.

FIG. 4 shows an exemplary arrangement of the timing generator 13. This timing generator is composed of an edge-triggered pulse generator (PG) 13*a* and a timing generator (TG2) 13*b* and outputs signals A and B.

Figure 5:
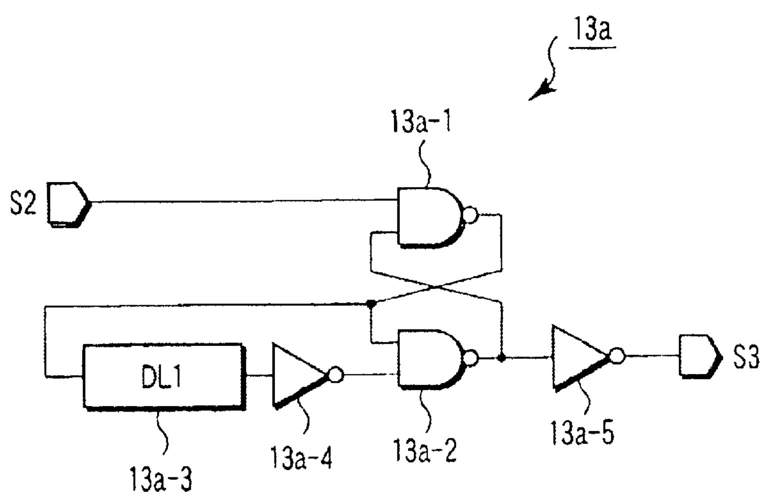
FIG. 5 shows an exemplary arrangement of the pulse generator in FIG. 4.
Figure 6:
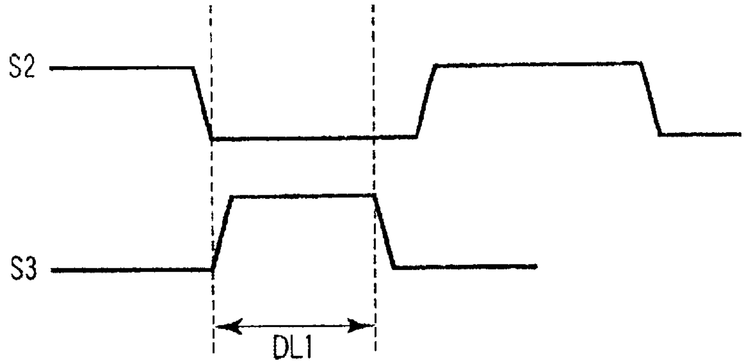
FIG. 6 is a waveform diagram illustrating the operation of the pulse generator in FIG. 5.

FIG. 5 shows an exemplary arrangement of the pulse generator 13*a*. This pulse generator, which is a one-shot (monostable) multivibrator, comprises cross-coupled NAND gates 13*a*-1 and 13*a*-2 forming a flip-flop circuit, a delay circuit 13*a*-3, and inverters 13*a*-4 and 13*a*-5. The pulse generator 13*a* responds to the output signal S2 of the NAND gate 12 to produce a pulse signal S3 which corresponds in width to the delay time DL1 introduced by the delay circuit 13*a*-3 as shown in FIG. 6. The pulse width of the signal S3 is set shorter than half the period of the output signal S2 of the NAND gate 12.

Figure 7:
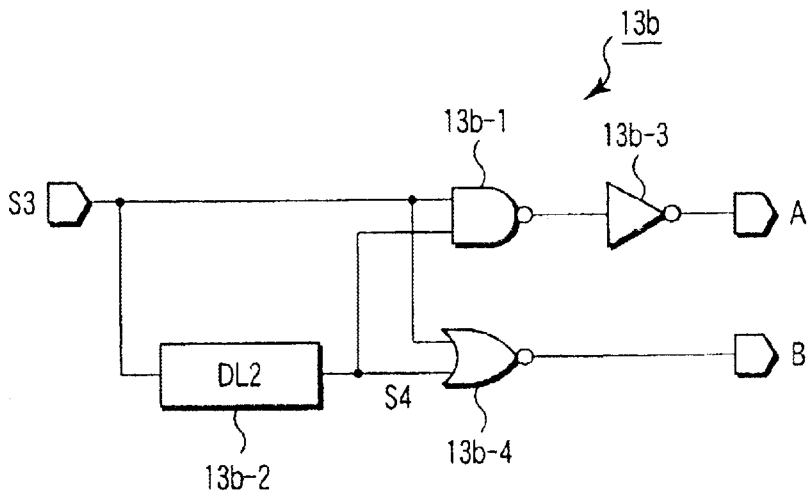
FIG. 7 shows an exemplary arrangement of the timing generator in FIG. 4.
Figure 8:
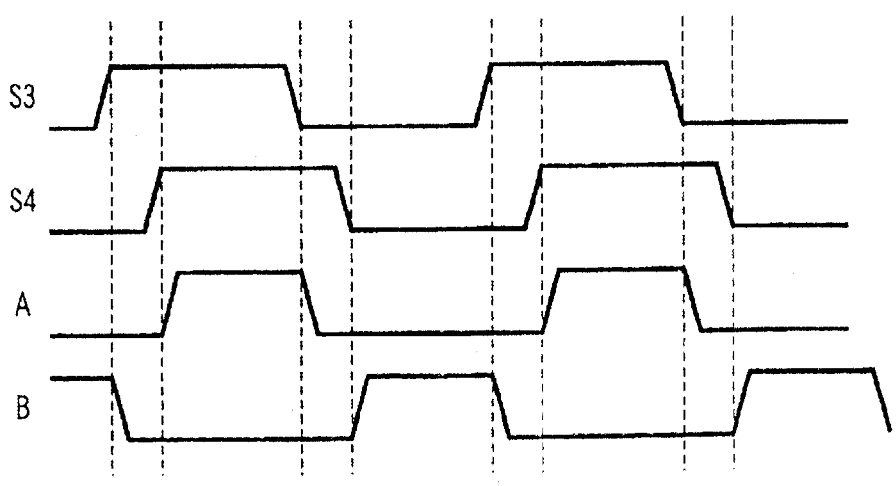
FIG. 8 is a waveform diagram illustrating the operation of the timing generator in FIG. 7.

FIG. 7 shows an exemplary arrangement of the timing generator (TG2) 13*b*. This timing generator is constructed from a NAND gate 13*b*-1, a delay circuit 13*b*-2, an inverter 13*b*-3, and a NOR gate 13*b*-4. The timing generator 13*b* responds to the output signal S3 of the pulse generator 13*a* to output complementary signals A and B as shown in FIG. 8.

Figure 9:
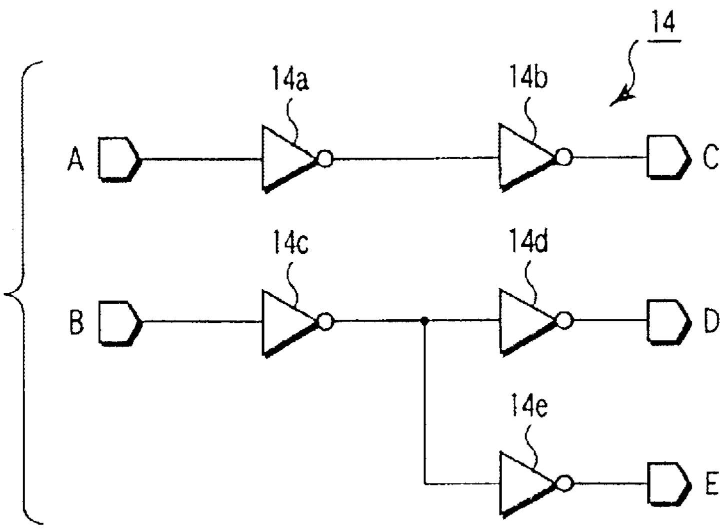
FIG. 9 shows an exemplary arrangement of the buffer circuit in FIG. 1.
Figure 10:
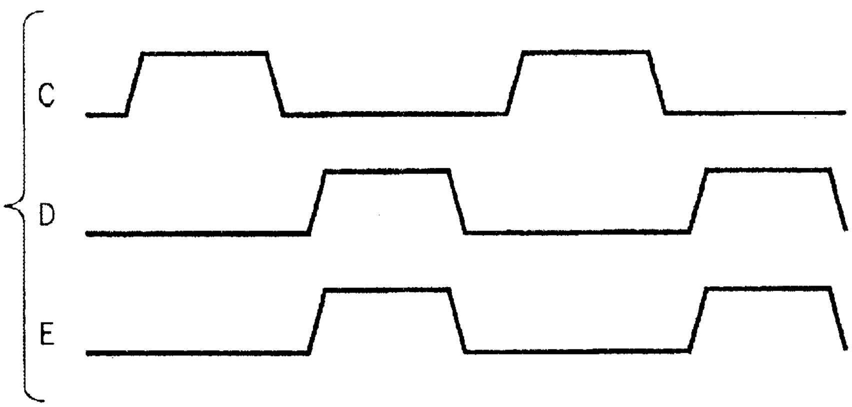
FIG. 10 is a waveform diagram illustrating the operation of the buffer circuit in FIG. 9.

FIG. 9 shows an exemplary arrangement of the buffer circuit 14. This buffer circuit is composed of inverters 14*a* through 14*e* which are connected as shown. As shown in FIG. 10, the buffer circuit 14 responds to the signals A and B output from the timing generator 13 to output signals C, D and E.

Figure 11:
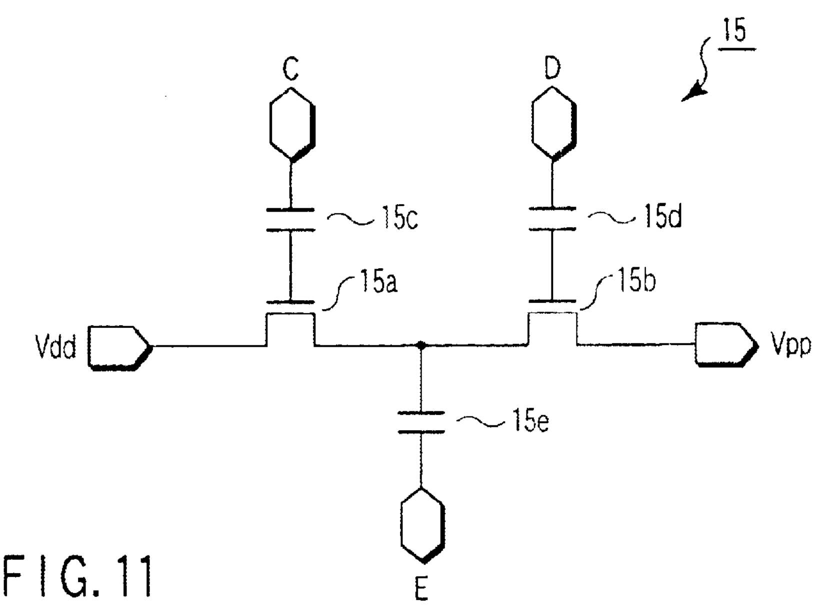
FIG. 11 shows an exemplary arrangement of the pump circuit in FIG. 1.

FIG. 11 shows an exemplary arrangement of the pump circuit 15. This pump circuit is composed of series-connected N channel MOS transistors 15*a* and 15*b* and capacitors 15*c*, 15*d* and 15*e*. The pump circuit 15 responds to the signals C, D and E output from the buffer circuit 14 to boost the power supply voltage Vdd to a voltage Vpp.

FIG. 12 shows the overall operation of the boosting circuit shown in FIG. 1. When the signal OST is raised to a high level, the oscillator 11 is enabled to output the pulse signal S1. In the initial state, the output voltage Vpp of the pump circuit 15 is at a low level; thus, the output voltage Vppmoni of the voltage detecting circuit 16 is at a low level. The output signal Vpon_p of the comparator 17 is therefore at a high level, enabling the NAND gate 12 to output the signal S2 at a high level. In response to this signal S2, the timing generator 13, the buffer circuit 14 and the pump circuit 15 operate, allowing the pump circuit to output the boosted voltage Vpp.

The comparator 17 responds to the signal Von output from the oscillator 11 to compare the output voltage Vppmoni of the voltage detecting circuit 16 with the reference voltage Vref with each cycle of the pulse signal S1. The signal Von is opposite in phase to the signal S1 from the oscillator 11. The comparator 17 performs a compare operation before the signal S1 rises. Therefore, the voltage of the output signal Vpon_p of the comparator 17 becomes established on the falling edge of the signal S1.

When, in the time interval T2 shown in FIG. 12, the output voltage Vpp of the pump circuit 15 exceeds the target voltage, the output voltage Vppmoni of the voltage detecting circuit 16 rises above the reference voltage Vref, thus causing the output signal Vpon_p of the comparator 17 to go to a low level. Thus, the output signal S1 of the NAND gate 12 is fixed at a high level, so that the pumping operation is stopped during the time interval T2.

According to the first embodiment, the synchronous comparator 17 is used to make a comparison between the output voltage Vppmoni of the voltage detecting circuit 16 adapted to detect the output voltage of the pump circuit 15 and the reference voltage Vref with each cycle of the output signal S1 of the oscillator 11, and the operation of the pump circuit 15 is controlled by the comparator output. For this reason, the operation of the pump circuit 15 can be controlled in one cycle of the output signal S1 of the oscillator 11, allowing variations in the output voltage Vpp of the pump circuit to be suppressed. Thus, the ripple component can be suppressed, allowing the capacitance of the decoupling capacitor to be reduced and an increase in the chip size to be avoided.

Moreover, the use of the synchronous comparator 17 that operates in synchronization with the signal Von from the oscillator 11 allows the operation of the pump circuit 15 to be controlled within one cycle of the oscillator output signal S1. Furthermore, the edge-triggered timing generator 13 and the edge-triggered delay circuits are used to control the starting and stopping of the pumping operation. For this reason, even if the oscillator 11 ceases its operation, the pump circuit 15 will not cease its operation before one pumping operation is completed. Thus, the charging of the capacitors that form the pump circuit 15 will not be stopped prematurely, allowing remaining charges in the capacitors to be suppressed and the generation of noise to be prevented.

[Second Embodiment]

FIG. 13 shows a boosting circuit according to a second embodiment of the present invention. In this figure, parts corresponding to those in FIG. 1 are denoted by like reference numerals.

A boosting circuit 15 of the second embodiment has a first signal path 20*a* and a second signal path 20*b*. The first signal path 20*a* includes an OR gate 23 acting as a switch circuit, and pulse generators 24 and 25. The second signal path 20*b* includes the comparator 17, an OR gate 26 acting as a switch circuit, and a pulse generator 27. The first and second signal paths share an OR gate 21 and a pulse generator 22. Unlike the first embodiment that includes the oscillator 11, in the second embodiment, the pulse generators 25 and 27 form oscillators.

In the first signal path 20*a*, the signal OST is applied to the OR gate 21 with the polarity inverted. The output signal B of the pulse generator 25 and the output signal of the pulse generator 27 are also applied to the OR gate 21 the output signal of which is applied to the pulse generator 22. The output signal of the pulse generator 22 is applied through the OR gate 23 to the pulse generator 24 together with the output signal Vpon_n of the comparator 17. The output signal B of the pulse generator 25 is applied to the buffer circuit 14 together with the output signal A of the pulse generator 24.

In the second signal path 20*b*, the signal Von output from the pulse generator 22 is applied to the comparator 17 the output signal Vpon_p of which is applied to the OR gate 26 together with the output signal of the pulse generator 22. The output signal of the OR gate 26 is applied to the pulse generator 27 to which the signal TMCT is applied. The period of the pulse signal output from the pulse generator 27 is controlled by the signal TMCT.

FIG. 14 shows an exemplary arrangement of the pulse generators 22, 24 and 25. Each of these pulse generators is constructed from cross-coupled NAND gates 22*a* and 22*b* forming a flip-flop circuit, a delay circuit 22*c* having a delay time of DL2, a delay circuit 22*d* having a delay time of DL1, and inverters 22*e* and 22*f*.

FIG. 15 illustrates the operation of the pulse generators 22, 24 and 25. These pulse generators, which are each a one-shot multivibrator, operate in such a way that, as shown in FIG. 15, when an input signal IN goes to a low level, an output signal OUT having a pulse width corresponding to the delay time DL1 is output after a lapse of time DL2.

FIG. 16 shows an exemplary arrangement of the pulse generator 27. This pulse generator is constructed from cross-coupled NAND gates 27*a* and 27*b* forming a flip-flop circuit, a delay circuit 27*c* having a delay time of DL2, a delay circuit 27*d* having a delay time of DL3 (>DL1), and inverters 27*e* and 27*f*.

FIG. 17 illustrates the operation of the pulse generator 27. This pulse generator, which is a one-shot multivibrator, operates in such a way that, as shown in FIG. 17, when an input signal IN goes to a low level, an output signal OUT having a pulse width corresponding to the delay time DL3 is output after a lapse of time DL2. The pulse width corresponding to DL3 is set longer than the pulse width corresponding to DL1 shown in FIG. 15.

In the pulse generators 22, 24, 25 and 27, setting of the delay time DL2 allows for prevention of the signals C, D and E from overlapping one another in time in the pumping operation of the pump circuit 15.

FIG. 18 shows an exemplary arrangement of the delay circuit 22*d*. This delay circuit is composed of a P channel MOS transistor 22*d*-1 and an N channel MOS transistor 22*d*-2 which are connected to form an inverter, a resistor R11 connected between the N channel MOS transistor 22*d*-2 and ground, an inverter 22*d*-3 connected between the node at which the transistors 22*d*-1 and 22*d*-2 are connected together and the output terminal, and a capacitor C connected between the input of the inverter 22*d*-3 and ground.

FIG. 19 shows an exemplary arrangement of the delay circuits 22*c* and 27*c*. These delay circuit are each composed of a P channel MOS transistor 22c-1 and an N channel MOS transistor 22c-2 which are connected to form an inverter, a resistor R12 connected between the N channel MOS transistor 22c-2 and ground, an inverter 22c-3 connected between the node at which the transistors 22c-1 and 22c-2 are connected together and the output terminal, and a capacitor C connected between the input of the inverter 22c-3 and ground. The value of the resistor R12 is set lower than that of the resistor R11 in the delay circuit 22d shown in FIG. 18 (R11>R12). Thus, the delay time DL2 set in the delay circuits 22c and 27c is less than the delay time DL2 set in the delay circuit 22d.

Figure 20:
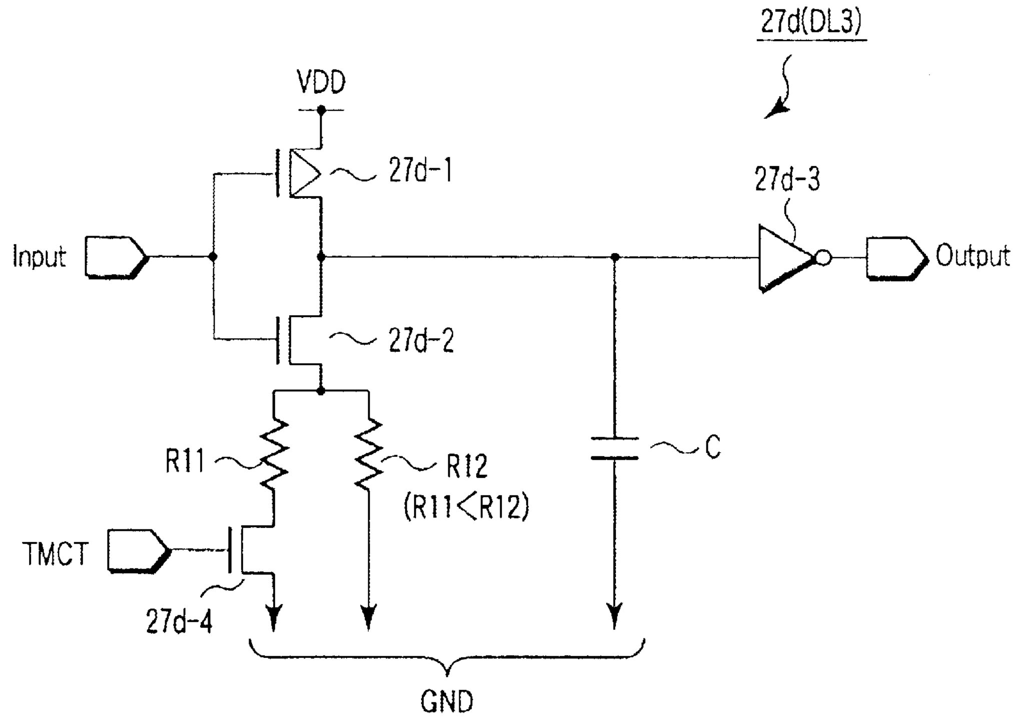
FIG. 20 shows an exemplary arrangement of the delay circuit **27*d* in FIG. 16**.

FIG. 20 shows an exemplary arrangement of the delay circuit 27d. This delay circuit is composed of a P channel MOS transistor 27d-1 and an N channel MOS transistor 27d-2 which are connected to form an inverter, a series combination of a resistor R11 and an N channel MOS transistor 27d-4 connected between the N channel MOS transistor 27d-2 and ground, a resistor R12 connected in parallel with the resistor R11 and the transistor 27d-4, an inverter 27d-3 connected between the node at which the transistors 27d-1 and 27d-2 are connected together and the output terminal, and a capacitor C connected between the input of the inverter 27d-3 and ground. The value of the resistor R11 is set smaller than that of the resistor R12 in the delay circuit 22d shown in FIG. 18 (R11<R12). The transistor 27d-2 has its gate connected to receive the signal TMCT.

In the above arrangement, as in the first embodiment, the output signals Vpon_p and Vpon_n of the comparator 17 are at high and low levels, respectively, when the output voltage Vpp of the pump circuit 15 is lower than the target voltage. Thus, the input condition of the OR gate 23 is met, bringing the first signal path 20a into operation. The OR gate 23 is enabled to output the output signal of the pulse generator 22 to the first signal path, so that the first signal path is brought into operation.

That is, when the signal OST goes high, each of the pulse generators 22, 24 and 25 operates in sequence to output pulse signals in succession. The output signals A and B of the respective pulse generators 24 and 25 are applied to the buffer circuit 14 which in turn outputs the signals C, D and E to drive the pump circuit 15. In this state, the comparator 17 makes a comparison between the reference voltage Vref and the output voltage Vppmoni of the voltage detecting circuit 16 with each cycle of the signal Von output from the pulse generator 22.

When the output voltage Vpp of the pump circuit 15 reaches the target voltage, the output signals Vpon_p and Vpon_n of the comparator 17 go low and high, respectively. Thus, the input condition of the OR gate 23 becomes unsatisfied while the input condition of the OR gate 26 becomes satisfied, the OR gate 23 is disabled while the OR gate 26 is enabled, causing the second signal path 20b to operate. Therefore, since the output signal of the pulse generator 22 is applied through the OR gate 26 to the pulse generator 27, the pulse generators 24 and 25 and the pump circuit 15 are disabled. In this state, the comparator 17 makes a comparison between the reference voltage Vref and the output voltage Vppmoni with each cycle of the signal Von output from the pulse generator 22. As a result, when the output voltage Vppmoni of the voltage detecting circuit 16 falls below the reference voltage Vref, the pulse generators 24 and 25 and the pump circuit 15 are enabled again.

According to the second embodiment, the pump circuit 15 is controlled by applying the output signal of the pulse generator 22 to a separate circuit in enabling or disabling the pump circuit and moreover the two pulse generators 24 and 25 act as substitutes for an oscillator. For this reason, the oscillator 11 can be omitted to make the arrangement simple and the design easy.

The pulse generators 24 and 25 that use edge-triggered delay circuits are used as an oscillator to control the pump circuit. For this reason, the pump circuit will be disabled at the completion of one cycle of pumping operation. Thus, the ripple can be made smaller, allowing the capacitance of the decoupling capacitor to be reduced.

The pump circuit is not enabled or disabled in the middle of the pumping operation. For this reason, the pump circuit will be enabled all the time from a stable state and disabled in the stable state, allowing the generation of noise to be suppressed.

The pulse generator 27 that is operated when the pump circuit 15 is disabled is designed so that its output pulse width can be adjusted by the signal TMCT. Thus, the current dissipation when the pump circuit is disabled can be reduced by increasing the output pulse width of the pulse generator 27.

[Third Embodiment]

Figure 21:
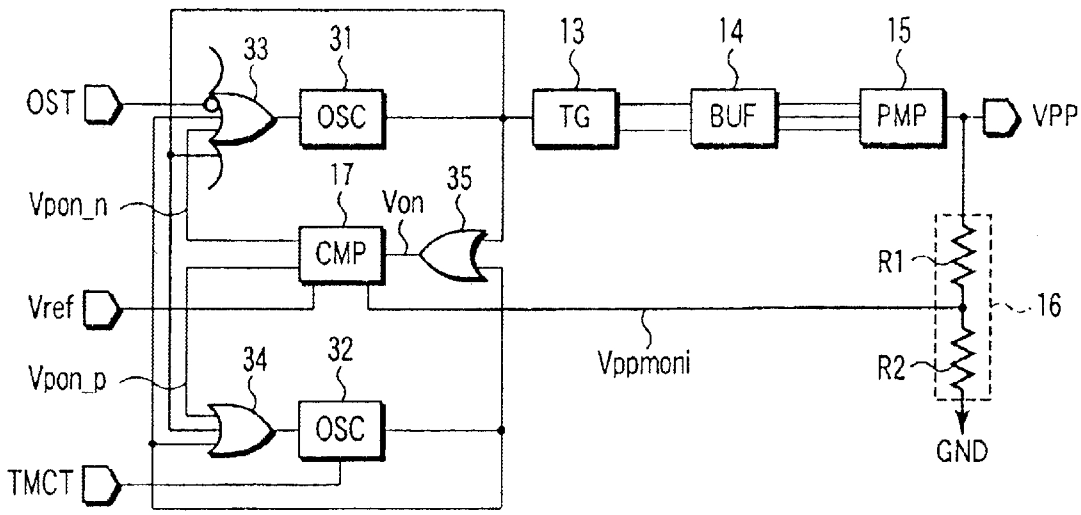
FIG. 21 is a schematic and block diagram representation of a boosting circuit according to a third embodiment of the present invention.

FIG. 21 shows a boosting circuit according to a third embodiment of the present invention. In this figure, parts corresponding to those in FIG. 1 are denoted by like reference numerals.

Unlike the first embodiment, the third embodiment is provided with two oscillators 31 and 32 and OR gates 33, 34 and 35.

The signal OST is applied to an input of the OR gate 33 with its polarity inverted. The OR gate 33 has its other inputs connected to receive output signals of the oscillators 31 and 32 and the output signal Vpon_n of the comparator 17. The OR gate 34 has its inputs connected to receive the output signals of the oscillators 31 and 32 and the output signal Vpon_p of the comparator 17. The output signal of the OR gate 34 is applied to the oscillator 32. The oscillation period of the oscillator 32 is controlled by the signal TMCT. The output signal of the oscillator 32 is applied to an input of the OR gate 35. The output signal of the oscillator 31 is applied to the timing generator 13 and to the other input of the OR gate 35 the output signal of which is applied to the comparator 17 as the signal Von. The comparator 17 makes a comparison between the reference voltage Vref and the output voltage Vppmoni of the voltage detecting circuit 16 to output the signals Vpon_p and Vpon_n.

The operation of the third embodiment is substantially the same as that of the second embodiment. The signal path varies between the operating and stopped states of the pump circuit 15. That is, when the pump circuit 15 operates, the oscillator 31 operates. When the pump circuit 15 is placed in the stopped state, on the other hand, the oscillator 31 is shut down, while the oscillator 32 operates.

When the output voltage Vppmoni of the voltage detecting circuit 16 is lower than the reference voltage Vref, the output signals Vpon_p and Vpon_n of the comparator 17 are at high and low levels, respectively. In this state, when the signal OST goes high, the oscillator 31 initiates operation. The output signal of the oscillator 31 is applied through the timing generator 13 and the buffer circuit 14 to the pump circuit 15. Thus, the pump circuit 15 is enabled to initiate a boosting operation. The output signal of the oscillator 31 is also applied through the OR gate 35 to the comparator 17 as the signal Von. The comparator 17 thus makes a comparison between the reference voltage Vref and the output voltage Vppmoni of the voltage detecting circuit 16 with each cycle of the signal output from the oscillator 31.

When the output voltage Vppmoni of the voltage detecting circuit 16 increases above the reference voltage Vref, the output signals Vpon_p and Vpon_n of the comparator 17 go low and high, respectively. As a result, the oscillator 31 is shut down, while the oscillator 32 is rendered operative. In this state, the comparator 17 responds to the signal applied thereto from the oscillator 32 through the OR gate 35 to perform a compare operation. When the output voltage Vppmoni of the voltage detecting circuit 16 falls below the reference voltage Vref, the pumping operation is resumed as described previously.

The third embodiment will also provide the same advantages as the first and second embodiments.

The period of the output signal of the oscillator 32 is made variable according to the level of the signal TMCT. For this reason, the current dissipation can be varied between the time when the circuit coupled to the output of the pump circuit 15 is in the operating state and the time when it is in the stopped state. Thus, when the chip is on standby, the period of oscillation of the oscillator 32 can be made longer to reduce the current dissipation.

[Fourth Embodiment]

Figure 22:
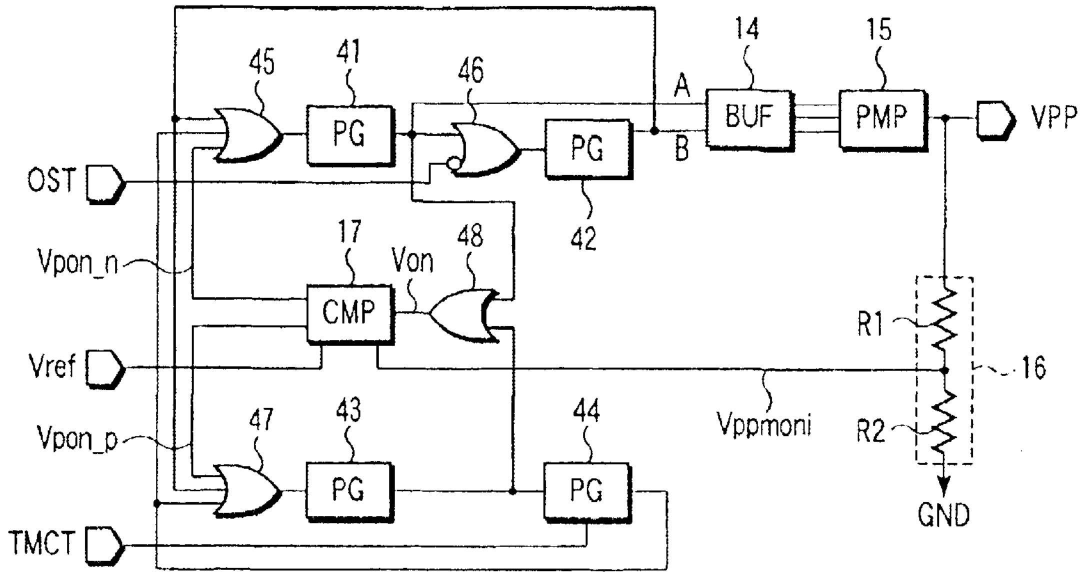
FIG. 22 is a schematic and block diagram representation of a boosting circuit according to a fourth embodiment of the present invention.

FIG. 22 shows a boosting circuit according to a fourth embodiment of the present invention. In this figure, parts corresponding to those in the third embodiment are denoted by like reference numerals.

In the fourth embodiment, unlike the third embodiment, two pulse generators are used to control the buffer circuit 14 without using the oscillators 31 and 32 and the timing generator 13. The fourth embodiment includes pulse generators 41 to 44 each comprised of a one-shot multivibrator and OR gates 45 to 48. The OR gate 45 has its inputs connected to receive output signals of the pulse generators 42 and 44 and the output signal Vpon_n of the comparator 17, and its output connected to the pulse generator 41 the output of which is connected to an input of the OR gate 46. The OR gate 46 has its other input connected to receive the inverse of the signal OST. The output signal of the OR gate 46 is applied to the pulse generator 42. The output signal A of the pulse generator 41 and the output signal B of the pulse generator 42 are applied to the buffer circuit 14.

The OR gate 47 has its inputs connected to receive output signals of the pulse generators 42 and 44 and the output signal Vpon_p of the comparator 17 and its output connected to the pulse generator 43 the output of which is connected to the input of the pulse generator 44 supplied with the signal TMCT. The output signals of the respective pulse generators 41 and 43 are applied through the OR gate 48 to the comparator 17 as the signal Von.

Figure 23:
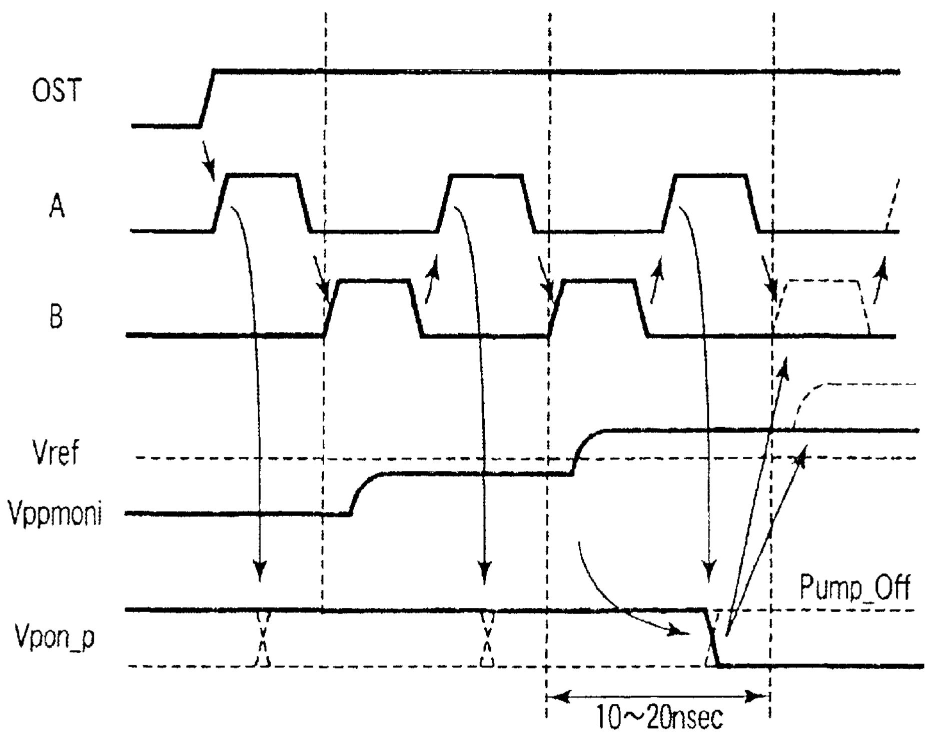
FIG. 23 is a waveform diagram illustrating the operation of the circuit in FIG. 22.

FIG. 23 illustrates the operation of the fourth embodiment. The operation of the fourth embodiment is substantially the same as that of the third embodiment. The signal path varies between the operating and stopped states of the pump circuit 15. That is, when the pump circuit 15 operates, the pulse generators 41 and 42 operate. When the pump circuit 15 is placed in the stopped state, on the other hand, the pulse generators 41 and 42 are shut down, while the pulse generators 43 and 44 are operated.

When the output voltage Vppmoni of the voltage detecting circuit 16 is lower than the reference voltage Vref, the output signals Vpon_p and Vpon_n of the comparator 17 are at high and low levels, respectively. In this state, when the signal OST goes high, the pulse generators 41 and 42 initiate operation. The output signals A and B of the respective pulse generators 41 and 42 are applied through the buffer circuit 14 to the pump circuit 15. Thus, the pump circuit 15 is enabled to initiate a boosting operation. The output signal of the pulse generator 41 is also applied through the OR gate 48 to the comparator 17 as the signal Von. The comparator 17 thus makes a comparison between the reference voltage Vref and the output voltage Vppmoni of the voltage detecting circuit 16 with each cycle of the signal output from the pulse generator 41.

When the output voltage Vppmoni of the voltage detecting circuit 16 increases above the reference voltage Vref, the output signals Vpon_p and Vpon_n of the comparator 17 go low and high, respectively. As a result, the pulse generators 41 and 42 are shut down, while the pulse generators 43 and 44 are rendered operative. In this state, the comparator 17 responds to the signal applied thereto from the pulse generator 43 through the OR gate 48 to perform a compare operation. When the output voltage Vppmoni of the voltage detecting circuit 16 falls below the reference voltage Vref, the pumping operation is resumed as described previously.

The fourth embodiment will also provide the same advantages as the first, second and third embodiments.

The pulse generators 41 and 42 can be modified as shown in FIG. 24. In the circuit shown in FIG. 22, the signal OST is applied to the OR gate 46 connected between the pulse generators 41 and 42. In contrast, in the circuit shown in FIG. 24, the signal OST is applied to a pulse generator 51 followed by a pulse generator 52 through an OR gate 53. Furthermore, the control signal TMCT is applied to both the pulse generators 51 and 52. The signal A is applied to the comparator 17 as the signal Von.

FIG. 25 is a waveform diagram illustrating the operation of the circuit shown in FIG. 24. The fourth embodiment can also be implemented by such a circuit as shown in FIG. 24.

[Fifth Embodiment]

FIG. 26 shows an application of a DC—DC converter to a bucking circuit 60 according to a fifth embodiment of the present invention. In this figure, parts corresponding to those in the first to fourth embodiments are denoted by like reference numerals.

In FIG. 26, the oscillator 11 is adapted to oscillate in response to the signal OST. The output signal S1 of the oscillator 11 is applied through a drive circuit (DRV) 61 to the gate of a P channel MOS transistor 62, which has its current path connected at one end to an external power supply (VEXT), for example, power supply voltage VDD and at the other end to an end of the resistor R1. An output voltage lower than the applied voltage is output as an internal power supply (VINT) at the node (output node) at which the transistor 62 and the resistor R1 are connected. The comparator 17 makes a comparison between the output voltage Vppmoni of the voltage detecting circuit 16 and the reference voltage Vref in response to the output signal Von of the oscillator 11. The output signal Vpon_p of the comparator 17 is applied to the drive circuit 61.

Figure 27:
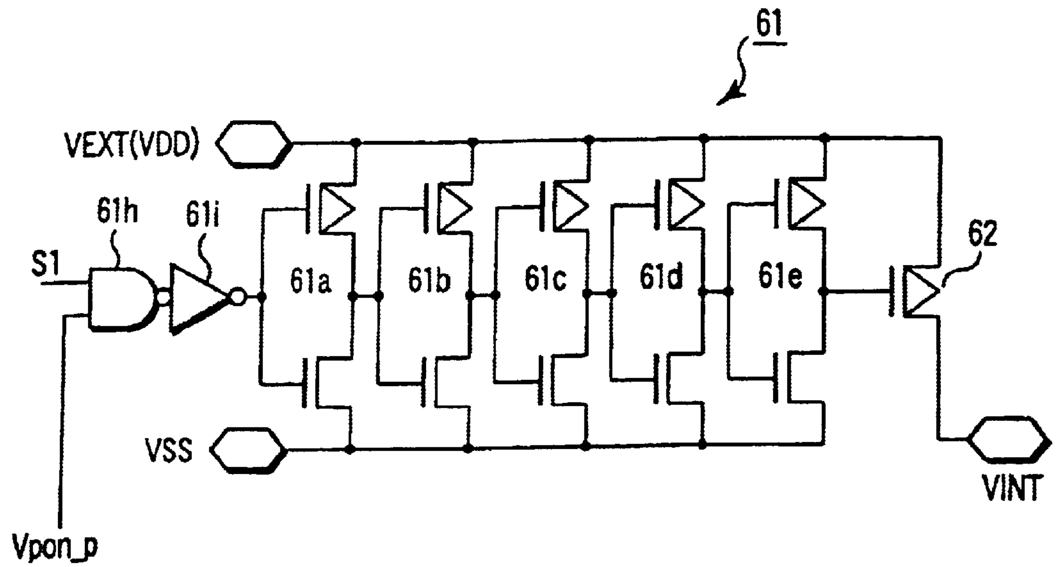
FIG. 27 shows an exemplary arrangement of the drive circuit in FIG. 26.
Figure 28:
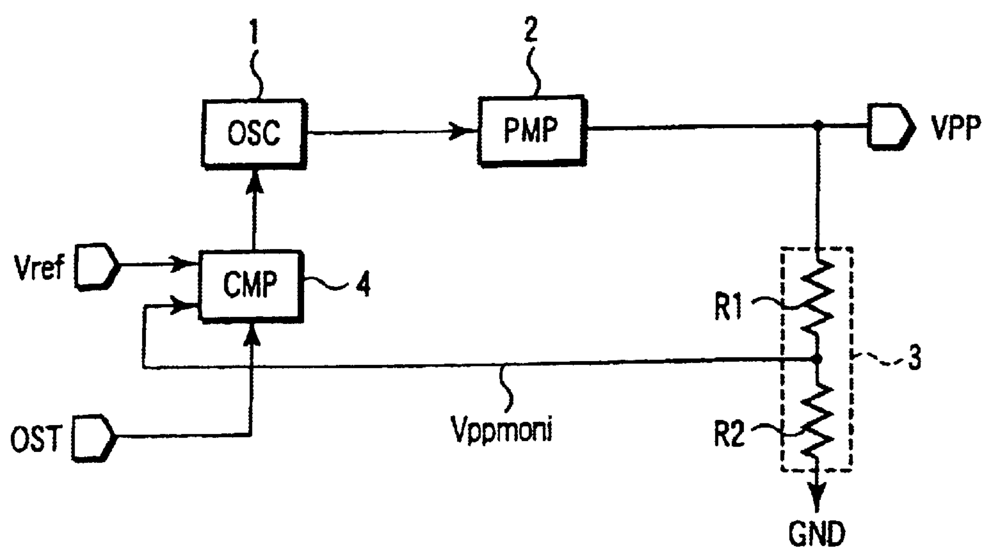
FIG. 28 shows a prior art boosting circuit.

FIG. 27 shows an exemplary arrangement of the drive circuit 61. To drive the P channel MOS transistor 62 which is large in size, the drive circuit 61 is constructed from a plurality of inverters 61*a* through 61*e*, a NAND gate 61*h*, and an inverter 61*i*. The NAND gate 61*h* has its inputs connected to receive the output signal S1 of the oscillator 11 and the output signal Vpon_p of the comparator 17 and its output connected through the inverter 61*i* to the inverter 61*a*. The P channel MOS transistors and the N channel MOS transistors that constitute the inverters 61*a* through 61*e* are formed so that their channel widths increase sequentially.

That is, the channel widths of the P and N channel MOS transistors in the inverter 61*a* are set the narrowest, while the channel widths of the P and N channel MOS transistors in the inverter 61*e* are set the widest.

In the above arrangement, when the signal OST goes to a high level, the oscillator 11 initiates oscillation. When the output voltage Vppmoni of the voltage detecting circuit 16 is higher than the reference voltage Vref, the output signal Vpon_p of the comparator 17 is at a low level. Thus, the output signal S1 of the oscillator 11 is applied to the drive circuit 61, allowing each of the inverters 61*a* through 61*e* in the drive circuit to output a high voltage in sequence. The output voltage of the inverter 61*e* is applied to the gate of the P channel MOS transistor 62. The transistor 62 is therefore turned on, outputting an internal voltage VINT which is lower than the power supply voltage VDD by the threshold voltage.

The comparator 17 makes a comparison between the reference voltage Vref and the output voltage Vppmoni of the voltage detecting circuit 16 with each cycle of the signal Von output from the oscillator 11. When the output voltage Vppmoni of the voltage detecting circuit 16 increases above the reference voltage Vref, the output signal Vpon_p of the comparator 17 goes high. Thereby, the NAND gate 61*h* is disabled from transferring the output signal S1 of the oscillator 11 to the inverters 61*a* through 61*e* and 61*i*. That is, the drive circuit 16 is disabled from driving the transistor 62.

According to the fifth embodiment, the comparator 17 makes a comparison between the reference voltage Vref and the output voltage Vppmoni of the voltage detecting circuit 16 with each cycle of the signal Von output from the oscillator 11 in response to the output signal Von of the oscillator 11 and controls the operation of the drive circuit 61 according to the result of comparison. Therefore, the internal voltage VINT output at the output node is controlled with each cycle of the output signal of the oscillator 11, allowing an internal voltage lower than the supply voltage with little ripple to be generated.

Moreover, since the internal voltage contains little ripple, the capacitance of the decoupling capacitor can be reduced. Thus, the chip size can be prevented from increasing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A DC—DC converter circuit comprising:

an oscillator which produces a signal;

a voltage generating circuit which is supplied with a first voltage and responsive to the output signal of the oscillator to generate a second voltage different from the first voltage;

a voltage detecting circuit which is connected to the output of the voltage generating circuit to detect the second voltage output from the voltage generating circuit and output an output voltage corresponding to the second voltage; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the voltage generating circuit in accordance with the result of the comparison.

2. The circuit according to claim 1, wherein the voltage generating circuit is a pump circuit which boosts the first voltage to generate the second voltage in response to the output signal of the oscillator.

3. The circuit according to claim 1, wherein the voltage generating circuit comprises a transistor connected between its input supplied with the first voltage and its output and a drive circuit which drives the transistor in response to the output signal of the oscillator to lower the first voltage and generate the second voltage at the output of the voltage generating circuit.

4. The circuit according to claim 1, wherein the comparator is a synchronous comparator which operates in synchronism with the output signal of the oscillator.

5. A DC—DC converter circuit comprising:

an oscillator which produces a signal;

a timing generator which is supplied with the output signal of the oscillator to generate a plurality of timing signals;

a pump circuit which is supplied with the timing signals from the timing generator and a first voltage to generate a second voltage higher than the first voltage in response to the timing signals;

a voltage detecting circuit which is connected to the output of the pump circuit to detect the second voltage output from the pump circuit and output an output voltage corresponding to the second voltage; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the timing generator.

6. The circuit according to claim 5, wherein the comparator is a synchronous comparator which operates in synchronism with the output signal of the oscillator.

7. The circuit according to claim 5, wherein the oscillator comprises a plurality of inverter circuits which are connected in series, and series combinations each of a resistance component and a capacitance component, each of the series combinations being connected between the output of a respective one of the inverter circuits and ground, and the oscillation frequency is varied by changing one of the resistance component and the capacitance component of each of the series combinations.

8. The circuit according to claim 5, wherein the timing generator includes an edge-triggered pulse generator, and the pump circuit completes one pumping operation in response to an output signal of the timing generator when the signal of the oscillator is interrupted.

9. A DC—DC converter circuit comprising:

a first pulse generator responsive to an input signal to output a first pulse signal;

first and second switch circuits which are supplied with the first pulse signal output from the first pulse generator;

a second pulse generator which is connected to the output of the first switch circuit to output a plurality of second pulse signals in response to the output signal of the first pulse generator supplied from the first switch circuit;

a pump circuit which is supplied with the plurality of second pulse signals output from the second pulse generator and a first voltage and boosts the first voltage to a second voltage in response to the plurality of second pulse signals;

a voltage detecting circuit which is connected to the output of the pump circuit to detect the second voltage output from the pump circuit and output an output voltage corresponding to the second voltage;

a comparator which is supplied with the first pulse signal output from the first pulse generator, the output voltage of the voltage detecting circuit, and a reference voltage, the comparator making a comparison between the output voltage of the voltage detecting circuit and the reference voltage with each cycle of the first pulse signal and turning the first switch circuit off and the second switch circuit on when the output voltage of the voltage detecting circuit is higher than the reference voltage; and a third pulse generator which is connected to the output of the second switch circuit to generate a third pulse signal and apply it to the first pulse generator in response to the output signal of the first pulse generator supplied via the second switch circuit.

10. The circuit according to claim 9, wherein the comparator is a synchronous comparator which operates in synchronism with the first pulse signal from the first pulse generator.

11. The circuit according to claim 9, wherein each of the first, second and third pulse generators is an edge-triggered pulse generator.

12. The circuit according to claim 9, wherein the third pulse generator is a pulse oscillator which has its output pulse width varied by a control signal, and the pulse width of the third pulse signal output from the third pulse generator when the pump circuit is shut down is wider than when the pump circuit is operating.

13. A DC—DC converter circuit comprising:

a first oscillator which output a first pulse signal;

a second oscillator which output a second pulse signal;

a timing generator which is supplied with the first pulse signal output from the first oscillator to generate a plurality of timing signals;

a pump circuit which is supplied with the timing signals from the timing generator and a first voltage to boost the first voltage to a second voltage in response to the timing signals;

a voltage detecting circuit which is connected to the output of the pump circuit to detect the second voltage output from the pump circuit and output an output voltage corresponding to the second voltage; and a comparator which is supplied with the first and second pulse signals output from the first and second oscillators, the output voltage of the voltage detecting circuit, and a reference voltage, the comparator making a comparison between the output voltage of the voltage detecting circuit and the reference voltage with each cycle of one of the first and second pulse signals and turning the first oscillator off and the second oscillator on when the output voltage of the voltage detecting circuit is higher than the reference voltage.

14. The circuit according to claim 13, wherein the timing generator includes an edge-triggered pulse generator, and the pump circuit completes one pumping operation in response to an output signal of the timing generator when the signal of the oscillator is interrupted.

15. The circuit according to claim 13, wherein the comparator is a synchronous comparator which operates in synchronism with the first and second pulse signals.

16. A DC—DC converter circuit comprising:

a first pulse generator which generates a first pulse signal;

a second pulse generator which is connected to the first pulse generator to generate a second pulse signal in response to the first pulse signal;

a third pulse generator which generates a third pulse signal;

a pump circuit which is supplied with the second pulse signal output from the second pulse generator and a first voltage and boosts the first voltage to a second voltage in response to the second pulse signal;

a voltage detecting circuit which is connected to the output of the pump circuit to detect the second voltage output from the pump circuit and output an output voltage corresponding to the second voltage; and a comparator which is supplied with the first and third pulse signals output from the first and third pulse generators, the output voltage of the voltage detecting circuit, and a reference voltage, the comparator making a comparison between the output voltage of the voltage detecting circuit and the reference voltage with each cycle of one of the first and third pulse signals and turning the first pulse generator off and the second pulse generator on when the output voltage of the voltage detecting circuit is higher than the reference voltage.

17. The circuit according to claim 16, wherein each of the first, second and third pulse generators is an edge-triggered pulse generator.

18. The circuit according to claim 16, wherein the comparator is a synchronous comparator which operates in synchronism with the first and third pulse signals.

19. A DC—DC converter circuit comprising:

an oscillator which produces a signal;

a transistor connected between a first power supply and an output terminal;

a drive circuit which is responsive to the output signal of the oscillator to drive the transistor;

a voltage detecting circuit which is connected to the output terminal to detect the voltage output from the output terminal and output an output voltage corresponding to the voltage at the output terminal; and a comparator which is supplied with the output signal of the oscillator, the output voltage of the voltage detecting circuit, and a reference voltage, the comparator making a comparison between the output voltage of the voltage detecting circuit and the reference voltage with each cycle of the output signal of the oscillator and controlling the operation of the drive circuit.

20. The circuit according to claim 19, wherein the drive circuit includes a plurality of inverter circuits formed of transistors different in size.

21. The circuit according to claim 19, wherein the comparator is a synchronous comparator which operates in synchronism with the output signal of the oscillator.

* * * * *